(12) United States Patent
Sharma et al.

(10) Patent No.: US 11,722,054 B2
(45) Date of Patent: *Aug. 8, 2023

(54) USE OF SHARED FEEDBACK AMONG TWO OR MORE REACTIVE SCHEMES

(71) Applicant: Cirrus Logic International Semiconductor Ltd., Edinburgh (GB)

(72) Inventors: Ajit Sharma, Austin, TX (US); Jason W. Lawrence, Austin, TX (US); Graeme G. Mackay, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,393

(22) Filed: Oct. 18, 2022

(65) Prior Publication Data

US 2023/0037944 A1    Feb. 9, 2023

Related U.S. Application Data

(63) Continuation of application No. 17/171,815, filed on Feb. 9, 2021, now Pat. No. 11,522,440.

(Continued)

(51) Int. Cl.
*H02M 1/32* (2007.01)

(52) U.S. Cl.
CPC ..................... *H02M 1/32* (2013.01)

(58) Field of Classification Search
CPC ...... H02M 1/32; H02J 7/00306; H02J 7/0063; H02J 7/00712; H02J 7/0029; H02J 7/005;

(Continued)

(56) References Cited

U.S. PATENT DOCUMENTS

| 5,248,524 A | 9/1993 | Soderlund |
| 5,617,016 A | 4/1997 | Borghi |

(Continued)

FOREIGN PATENT DOCUMENTS

| CN | 110784140 A | 2/2020 |
| EP | 1919058 A2 | 5/2008 |

(Continued)

OTHER PUBLICATIONS

Stmicroelectronics NV, AN4218—Hardware design guideline power supply and voltage measurement—Application Note, Doc ID 024014 Rev 3, 26 pages, Oct. 2015.

(Continued)

*Primary Examiner* — Kyle J Moody
*Assistant Examiner* — Jye-June Lee
(74) *Attorney, Agent, or Firm* — Jackson Walker L.L.P (57) ABSTRACT

A power delivery system may include a power converter configured to electrically couple to a power source and further configured to supply electrical energy to one or more loads electrically coupled to an output of the power converter and control circuitry configured to control the power converter in accordance with a control variable. The control circuitry may include a first control mechanism configured to generate a first intermediate control variable based on a first physical quantity associated with the power delivery system, a second control mechanism configured to generate a second intermediate control variable based on a second physical quantity associated with the power delivery system, a selector configured to select the control variable from the first intermediate control variable and the second intermediate control variable, and a shared feedback memory element configured to feed back the control variable to inputs of the first control mechanism and the second control mechanism, such that the first control mechanism generates (Continued)

the first intermediate control variable based on the first physical quantity and the control variable, and the second control mechanism generates the second intermediate control variable based on the second physical quantity and the control variable.

6 Claims, 10 Drawing Sheets

Related U.S. Application Data (60) Provisional application No. 63/058,032, filed on Jul. 29, 2020.

(58) Field of Classification Search
CPC ............. H02J 7/00304; H02J 7/007182; H02J 2207/20; H02J 2310/22
See application file for complete search history.

(56) References Cited

U.S. PATENT DOCUMENTS

| | | |
|---|---|---|
| 5,757,167 A | 5/1998 | Arora et al. |
| 6,177,786 B1 | 6/2001 | Donohue |
| 6,597,158 B2 | 7/2003 | Umeda |
| 7,102,340 B1 | 9/2006 | Ferguson |
| 7,190,150 B2 | 3/2007 | Chen et al. |
| 7,906,939 B2 | 3/2011 | Kung et al. |
| 9,088,247 B2 | 7/2015 | Amo et al. |
| 9,577,587 B2 | 2/2017 | Maru et al. |
| 9,639,102 B2 | 5/2017 | Dally |
| 9,742,393 B2 | 8/2017 | Pavao-Moreira et al. |
| 10,263,523 B1 | 4/2019 | Sonntag et al. |
| 10,476,392 B1 | 11/2019 | Matsuura et al. |
| 10,673,423 B2 | 6/2020 | Forghani-Zadeh et al. |
| 10,720,835 B2 | 7/2020 | King et al. |
| 10,734,885 B2 | 8/2020 | King et al. |
| 2001/0020802 A1 | 9/2001 | Kitagawa et al. |
| 2005/0264268 A1 | 12/2005 | Ueno |
| 2006/0139819 A1 | 6/2006 | May |
| 2007/0188134 A1* | 8/2007 | Hussain ............ H02J 7/007182 320/114 |
| 2008/0129219 A1 | 6/2008 | Smith et al. |
| 2008/0278136 A1 | 11/2008 | Murtojarvi |
| 2009/0266397 A1 | 10/2009 | Gibson et al. |
| 2010/0019702 A1 | 1/2010 | Jang et al. |
| 2010/0156175 A1 | 6/2010 | Wei |
| 2011/0075446 A1 | 3/2011 | Doutreloigne et al. |
| 2011/0121653 A1 | 5/2011 | Hartular et al. |
| 2012/0205974 A1 | 8/2012 | McCaslin et al. |
| 2012/0268094 A1 | 10/2012 | Scaldaferri et al. |
| 2013/0106188 A1 | 5/2013 | Ishibashi et al. |
| 2014/0197814 A1 | 7/2014 | Shi et al. |
| 2016/0064986 A1 | 3/2016 | Langlinais et al. |
| 2017/0005647 A1 | 1/2017 | Pan et al. |
| 2017/0072812 A1 | 3/2017 | Von Novak et al. |
| 2019/0181754 A1 | 6/2019 | Ash et al. |
| 2019/0245444 A1 | 8/2019 | Kimura |
| 2020/0235712 A1 | 7/2020 | May et al. |
| 2020/0367513 A1 | 11/2020 | Boutte et al. |
| 2021/0083578 A1 | 3/2021 | King et al. |
| 2021/0159798 A1 | 5/2021 | Mackay et al. |
| 2021/0364560 A1 | 11/2021 | Holland et al. |
| 2021/0367510 A1 | 11/2021 | Lawrence et al. |
| 2021/0367514 A1 | 11/2021 | Lawrence et al. |
| 2021/0367515 A1 | 11/2021 | Mackay et al. |
| 2021/0367517 A1 | 11/2021 | Lawrence et al. |
| 2022/0035389 A1 | 2/2022 | Mackay et al. |
| 2022/0037903 A1* | 2/2022 | Mackay ................. H02J 7/0048 |
| 2022/0037907 A1* | 2/2022 | Mackay ................. H02M 1/32 |
| 2022/0037908 A1* | 2/2022 | Mackay ............ H02J 7/007182 |

FOREIGN PATENT DOCUMENTS

| | | |
|---|---|---|
| EP | 2775599 A1 | 9/2014 |
| EP | 3214746 A1 | 9/2017 |
| EP | 3240171 A1 | 11/2017 |
| FR | 2851091 A1 | 8/2004 |
| GB | 2555902 A | 5/2018 |
| TW | 201228201 A | 7/2012 |
| WO | 2012135//8 A1 | 10/2012 |
| WO | 2017027393 A1 | 2/2017 |
| WO | 2019135820 A1 | 7/2019 |

OTHER PUBLICATIONS

Freescale Semiconductor, Inc., Multimedia Applications Division, i.MX233 Power Management Unit and Battery Charger—Application Note, Document No. AN3883, Rev. 0, 36 pages, Jul. 2009.

Texas Instruments, TPS6128x Low-, Wide-Voltage Battery Front-End DC/DC Converter Single-Cell Li-Ion, Ni-Rich, Si-Anode Applications—Data sheet, SLVSBI1 A, 57 pages, Oct. 2013, Revised Sep. 2014.

Texas Instruments, Designing Robust TPS65217 Systems for VIN Brownout—Application Report, 13 pages, Oct. 2017.

Renesas Electronics Corporation, Preventing Subsystem Brownouts in Mobile Devices—White Paper, 6 pages.

MFJ Enterprises, Inc., MFJ—Super Battery Booster—Model MFJ-4416C—Instruction Manual, Version 0A, 16 pages, 2017.

International Search Report and Written Opinion of the International Searching Authority, International Application No. PCT/US2020/056782, dated Mar. 4, 2021.

Van Vroonhoven, Caspar, A 0-to-60V-Input Vcm Coulomb Counter with Signal-Dependent Supply Current and ±0.5% Gain Inaccuracy from -50° C. to 125° C., 2020 IEEE International Solid-State Circuits Conference, Feb. 19, 2020.

International Search Report and Written Opinion of the International Searching Authority, International Application No. PCT/US2021/029631, —Jul. 23, 2021.

Qiu et al., "Digital Average Current-Mode Control of PWM DC-DC Converts without Current Sensors", IEEE Transactions on Industrial Electronics, IEEE Service Center, vol. 57, No. 5, May 10, 2010, Piscataway, NJ, USA.

International Search Report and Written Opinion of the International Searching Authority, International Application No. PCT/US2021/029584, dated Jul. 30, 2021.

International Search Report and Written Opinion of the International Searching Authority, International Application No. PCT/US2021/032474, dated Aug. 3, 2021.

Vinnikov et al., "Solar Optiverter—A Novel Hybrid Approach to the Photovoltaic Module Level Power Electronics", IEEE Transactions on Industrial Electronics, IEEE Service Center, vol. 66, No. 5, May 1, 2019, pp. 3869-3880, Piscataway, NJ, USA.

International Search Report and Written Opinion of the International Searching Authority, International Application No. PCT/US2021/032496, dated Aug. 4, 2021.

International Search Report and Written Opinion of the International Searching Authority, International Application No. PCT/US2021/030932, dated Aug. 20, 2021.

International Search Report and Written Opinion of the International Searching Authority, International Application No. PCT/US2021/039356, dated Oct. 1, 2021.

International Search Report and Written Opinion of the International Searching Authority, International Application No. PCT/US2020/047237, dated Oct. 30, 2020.

Stala, Robert et al., "A Switched-Capacitor DC-DC Converter with Variable Number of Voltage Gains and Fault-Tolerant Operation", IEEE Transactions on Industrial Electronics, IEEE Service Center, Piscataway, NJ, US, vol. 66, No. 5, May 1, 2019.

International Search Report and Written Opinion of the International Searching Authority, International Application No. PCT/US2020/039509, dated Oct. 8, 2021.

(56) References Cited

OTHER PUBLICATIONS

International Search Report and Written Opinion of the International Searching Authority, International Application No. PCT/US2020/041535, dated Oct. 14, 2021.
International Search Report and Written Opinion of the International Searching Authority, International Application No. PCT/US2021/039373, dated Sep. 22, 2021.
Yu, Yangwei: "Choosing the Boost with Bypass or Pass Through", Jun. 30, 2017, Retrieved from the Internet Sep. 10, 2021.
Texas Instruments: TPS61291 Loe IQ Boost Converter with Bypass Operation, Sep. 30, 2014, Retrieved from the Internet Sep. 10, 2021.
Search Report under Section 17, UKIPO, Application No. GB2106142.9, dated Oct. 20, 2021.
Combined Search and Examination Report under Sections 17 and 18(3), UKIPO, Application No. GB2106144.5, dated Oct. 25, 2021.
International Search Report and Written Opinion of the International Searching Authority, International Application No. PCT/US2021/041547, dated Nov. 2, 2021.
International Search Report and Written Opinion of the International Searching Authority, International Application No. PCT/US2021/041918, dated Nov. 10, 2021.
International Search Report and Written Opinion of the International Searching Authority, International Application No. PCT/US2021/041544, dated Nov. 10, 2021.

\* cited by examiner

USE OF SHARED FEEDBACK AMONG TWO OR MORE REACTIVE SCHEMES

RELATED APPLICATION

The present disclosure is a continuation of U.S. Non-Provisional patent application Ser. No. 17/171,815, filed Feb. 9, 2021, which claims priority to U.S. Provisional Patent Application Ser. No. 63/058,032, filed Jul. 29, 2020, each of which is incorporated by reference herein in its entirety.

FIELD OF DISCLOSURE

The present disclosure relates in general to circuits for electronic devices, including without limitation personal portable devices such as wireless telephones and media players, and more specifically, to limiting current in a power converter.

BACKGROUND

Portable electronic devices, including wireless telephones, such as mobile/cellular telephones, tablets, cordless telephones, mp3 players, and other consumer devices, are in widespread use. Such a portable electronic device may include circuitry for implementing a power converter for converting a battery voltage (e.g., provided by a lithium-ion battery) into a supply voltage delivered to one or more components of the portable electronic device. The power delivery network may also regulate such supply voltage, and isolate the downstream loads of these one or more devices from fluctuation in an output voltage of the battery over the course of operation.

In addition to regulating the supply rail for the supply voltage, it may be desirable for the power converter (or a control circuit for the power converter) to provide for active protection mechanisms to limit an amount of current that can be drawn by the one or more components powered from the supply rail.

SUMMARY

In accordance with the teachings of the present disclosure, one or more disadvantages and problems associated with existing approaches to operating a power converter may be reduced or eliminated.

In accordance with embodiments of the present disclosure, a power delivery system may include a power converter configured to electrically couple to a power source and further configured to supply electrical energy to one or more loads electrically coupled to an output of the power converter and control circuitry configured to control the power converter in accordance with a control variable. The control circuitry may include a first control mechanism configured to generate a first intermediate control variable based on a first physical quantity associated with the power delivery system, a second control mechanism configured to generate a second intermediate control variable based on a second physical quantity associated with the power delivery system, a selector configured to select the control variable from the first intermediate control variable and the second intermediate control variable, and a shared feedback memory element configured to feed back the control variable to inputs of the first control mechanism and the second control mechanism, such that the first control mechanism generates the first intermediate control variable based on the first physical quantity and the control variable, and the second control mechanism generates the second intermediate control variable based on the second physical quantity and the control variable.

In accordance with these and other embodiments of the present disclosure, a method may be used in a power delivery system having a power converter configured to electrically couple to a power source and further configured to supply electrical energy to one or more loads electrically coupled to an output of the power converter. The method may include generating, with a first control mechanism, a first intermediate control variable based on a first physical quantity associated with the power delivery system. The method may further include generating, with a second control mechanism, a second intermediate control variable based on a second physical quantity associated with the power delivery system. The method may also include selecting a control variable from the first intermediate control variable and the second intermediate control variable, controlling the power converter in accordance with a control variable, storing the control variable in a shared feedback memory element, and feeding back the control variable to inputs of the first control mechanism and the second control mechanism, such that the first control mechanism generates the first intermediate control variable based on the first physical quantity and the control variable, and the second control mechanism generates the second intermediate control variable based on the second physical quantity and the control variable.

In accordance with these and other embodiments of the present disclosure, a mobile device may include a power source, one or more loads, a power converter electrically coupled to the power source and further configured to supply electrical energy to the one or more loads, and control circuitry configured to control the power converter in accordance with a control variable. The control circuitry may include a first control mechanism configured to generate a first intermediate control variable based on a first physical quantity associated with the power delivery system, a second control mechanism configured to generate a second intermediate control variable based on a second physical quantity associated with the power delivery system, a selector configured to select the control variable from the first intermediate control variable and the second intermediate control variable, and a shared feedback memory element configured to feed back the control variable to inputs of the first control mechanism and the second control mechanism, such that the first control mechanism generates the first intermediate control variable based on the first physical quantity and the control variable, and the second control mechanism generates the second intermediate control variable based on the second physical quantity and the control variable.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
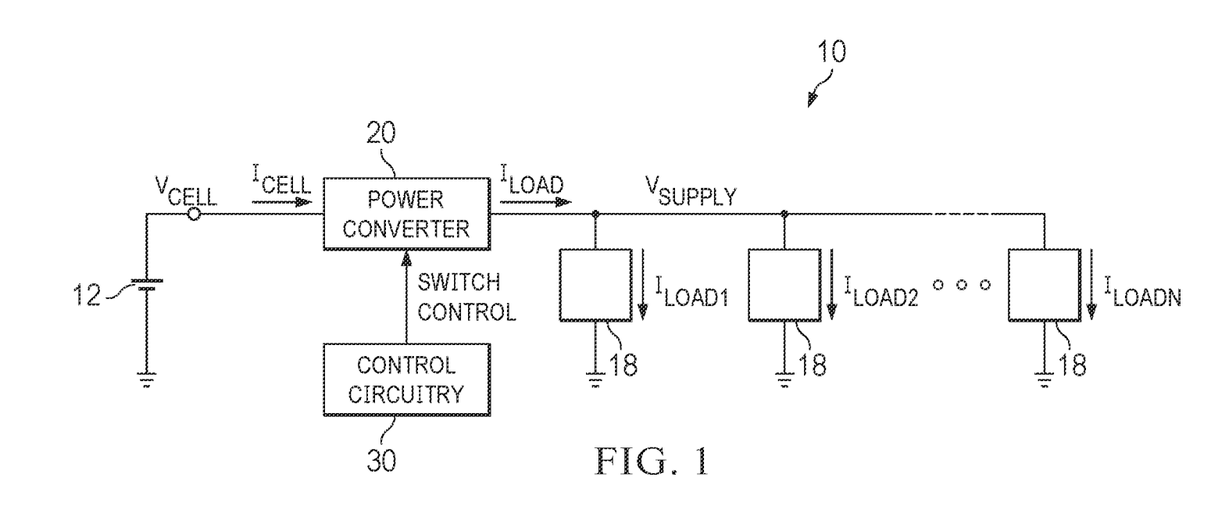
FIG. 1 illustrates a block diagram of selected components of an example power delivery network, in accordance with embodiments of the present disclosure.

FIG. 1 illustrates a block diagram of selected components of an example power delivery network 10, in accordance with embodiments of the present disclosure. In some embodiments, power delivery network 10 may be implemented within a portable electronic device, such as a smart phone, tablet, game controller, and/or other suitable device.

As shown in FIG. 1, power delivery network 10 may include a battery 12 and a power converter 20 configured to convert a battery voltage $V_{CELL}$ generated by battery 12 into a supply voltage $V_{SUPPLY}$ used to power a plurality of downstream components 18, wherein each downstream component 18 may draw a respective current $I_{LOAD1}$, $I_{LOAD2}$, $I_{LOAD3}$, etc., from the output of power converter 20, meaning an aggregate load current $I_{LOAD}=I_{LOAD1}+I_{LOAD2}+\ldots+I_{LOADN}$ may be generated by power converter 20. Power converter 20 may be implemented using a boost converter, buck converter, buck-boost converter, transformer, charge pump, and/or any other suitable power converter. Downstream components 18 of power delivery network 10 may include any suitable functional circuits or devices of power delivery network 10, including without limitation other power converters, processors, audio coder/decoders, amplifiers, display devices, etc.

As shown in FIG. 1, power delivery network 10 may also include control circuitry 30 for controlling operation of power converter 20, including switching and commutation of switches internal to power converter 20. In addition, as described in greater detail below, control circuitry 30 may also implement active protection mechanisms for limiting current $I_{CELL}$ drawn from battery 12.

Figure 2:
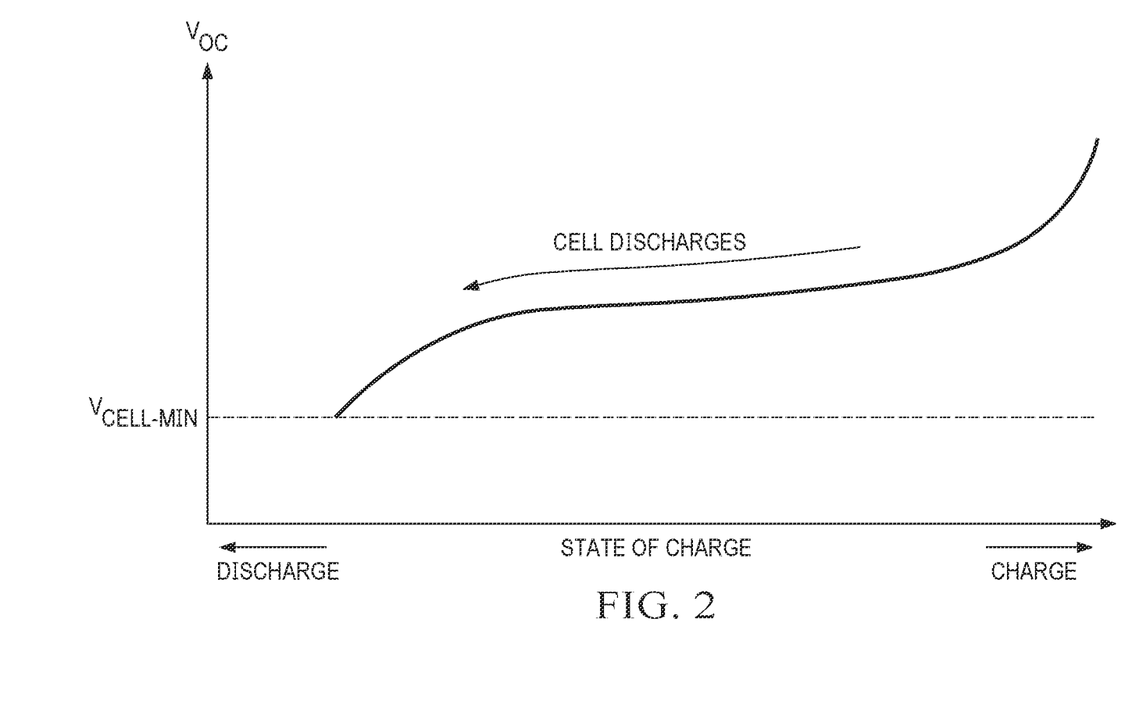
FIG. 2 illustrates an example graph of an open circuit voltage of a battery versus the battery's state of charge, in accordance with embodiments of the present disclosure.

Lithium-ion batteries are typically known to operate from 4.2 V down to 3.0 V, known as an open circuit voltage $V_{OC}$ of the battery (e.g., battery 12). As a battery discharges due to a current drawn from the battery, the state of charge of the battery may also decrease, and open circuit voltage $V_{OC}$ (which may be a function of state of charge) may also decrease as a result of electrochemical reactions taking place within the battery, as shown in FIG. 2. Outside the range of 3.0 V and 4.2 V for open circuit voltage $V_{OC}$, the capacity, life, and safety of a lithium-ion battery may degrade. For example, at approximately 3.0 V, approximately 95% of the energy in a lithium-ion cell may be spent (i.e., state of charge is 5%), and open circuit voltage $V_{OC}$ would be liable to drop rapidly if further discharge were to continue. Below approximately 2.4V, metal plates of a lithium-ion battery may erode, which may cause higher internal impedance for the battery, lower capacity, and potential short circuit. Thus, to protect a battery (e.g., battery 12) from over-discharging, many portable electronic devices may prevent operation below a predetermined end-of-discharge voltage $V_{CELL-MIN}$.

Figure 3:
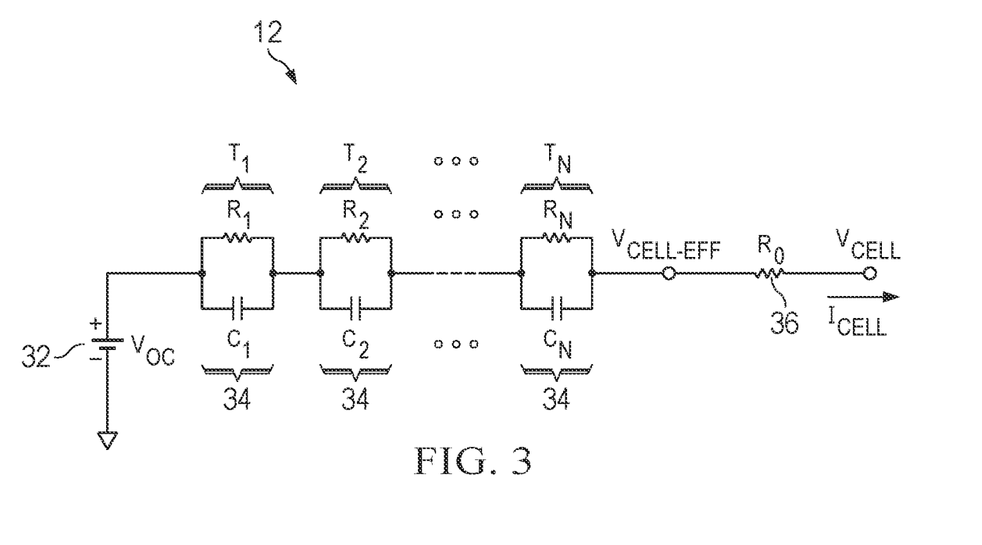
FIG. 3 illustrates a block diagram of selected components of an example equivalent circuit model for a battery, in accordance with embodiments of the present disclosure.

FIG. 3 illustrates a block diagram of selected components of an equivalent circuit model for battery 12, in accordance with embodiments of the present disclosure. As shown in FIG. 3, battery 12 may be modeled as having a battery cell 32 having an open circuit voltage $V_{OC}$ in series with a plurality of parallel resistive-capacitive sections 34 and further in series with an equivalent series resistance 36 of battery 12, such equivalent series resistance 36 having a resistance of $R_0$. Resistances $R_1, R_2, \ldots R_N$, and respective capacitances $C_1, C_2, \ldots, C_N$ may model battery chemistry-dependent time constants $T_1, T_2, \ldots, T_N$, that may be lumped with open circuit voltage $V_{OC}$ and equivalent series resistance 36. Notably, an electrical node depicted with voltage $V_{CELL-EFF}$ in FIG. 3 captures the time varying discharge behavior of battery 12, and battery voltage $V_{CELL}$ is an actual voltage seen at the output terminals of battery 12. Voltage $V_{CELL-EFF}$ may not be directly measurable, and thus battery voltage $V_{CELL}$ may be the only voltage associated with battery 12 that may be measured to evaluate battery state of health. Also of note, at a current draw of zero (e.g., $I_{CELL}=0$), battery voltage $V_{CELL}$ may be equal to voltage $V_{CELL-EFF}$ which may in turn be equal to an open circuit voltage $V_{OC}$ at a given state of charge.

Figure 4:
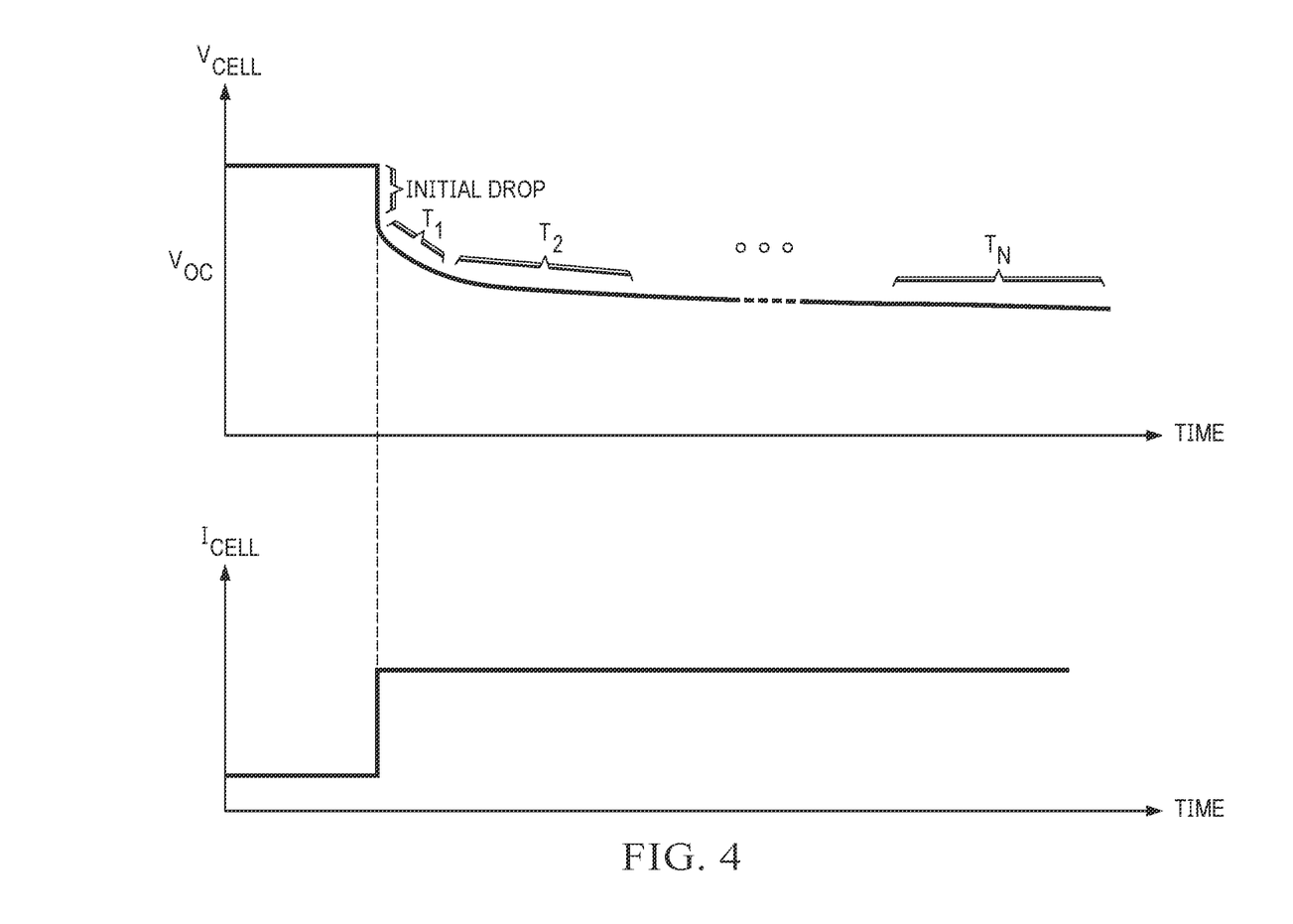
FIG. 4 illustrates an example graph of a battery voltage and a battery current versus time associated with a current step drawn from a battery, in accordance with embodiments of the present disclosure.

FIG. 4 illustrates example graphs of battery voltage $V_{CELL}$ and battery current $I_{CELL}$ versus time associated with a current step drawn from battery 12, in accordance with embodiments of the present disclosure. As shown in FIG. 4, in response to a current step event, battery voltage $V_{CELL}$ may respond to the step, as the response curve for battery voltage $V_{CELL}$ experiences an initial instantaneous drop (e.g., due to equivalent series resistance 36) and time-dependent voltage drops due to time constants $T_1, T_2, \ldots, T_N$. Open circuit voltage $V_{OC}$ and the various impedances $R_0, R_1, R_2, \ldots R_N$, may be a function of state of charge of battery 12, thus implying that a transient response to a new, fully-charged battery could be significantly different from that of an aged, partially-discharged battery.

In operation, control circuitry 30 may determine a maximum battery current $I_{CELL}$ that may be drawn from battery 12 at any given instant based on one or more constraints, including protection of battery 12, stability of power converter 20, and/or limitations associated with practical limitations.

Figure 5:
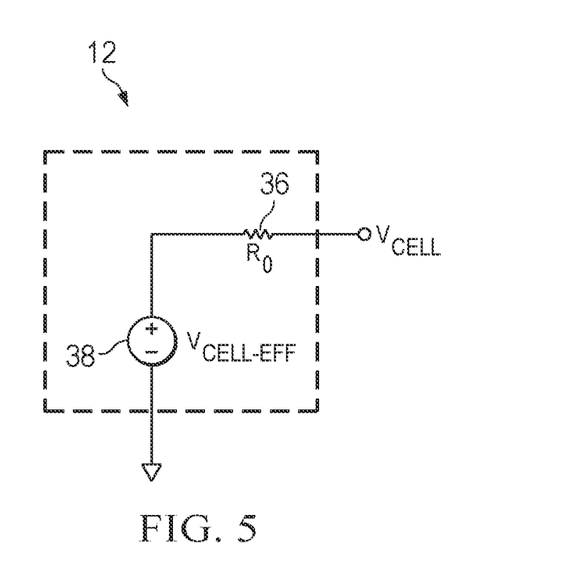
FIG. 5 illustrates an example first-order model of a battery simplified to a time-varying voltage source in series with an equivalent series resistance, in accordance with embodiments of the present disclosure.

A first constraint that may be imposed by control circuitry 30 is battery-imposed limitations for the maximum of battery current $I_{CELL}$. To illustrate application of this constraint, FIG. 5 illustrates a first-order model of battery 12 simplified to a time-varying voltage source 38 with voltage $V_{CELL-EFF}$ in series with equivalent series resistance 36 having a resistance value of $R_0$, in accordance with embodiments of the present disclosure. A maximum battery current $I_{CELL-MAX}$ that battery 12 may be capable of delivering may be directly dependent on equivalent series resistance 36. Battery current $I_{CELL}$ must pass through equivalent series resistance 36, which may reduce battery voltage $V_{CELL}$ from voltage $V_{CELL-EFF}$ by an amount equal to resistance $R_0$ multiplied by battery current $I_{CELL}$ (e.g., $V_{CELL}=V_{CELL-EFF}-R_0 I_{CELL}$) Perhaps more significantly, battery current $I_{CELL}$ flowing through equivalent series resistance 36 may cause power dissipation within battery 12 that is equal to resistance $R_0$ multiplied by the square of battery current $I_{CELL}$ (e.g., $P=R_0 I_{CELL}^2$). At high rates of discharge, battery current $I_{CELL}$ may lead to significant heating within battery 12. The requirement discussed above that battery voltage $V_{CELL}$ must remain above end-of-discharge voltage $V_{CELL-MIN}$ sets a limitation on maximum battery current $I_{CELL-MAX}$, as given by:

$$I_{CELL-MAX} = \frac{V_{CELL-EFF} - V_{CELL-MIN}}{R_0}$$

Figure 6:
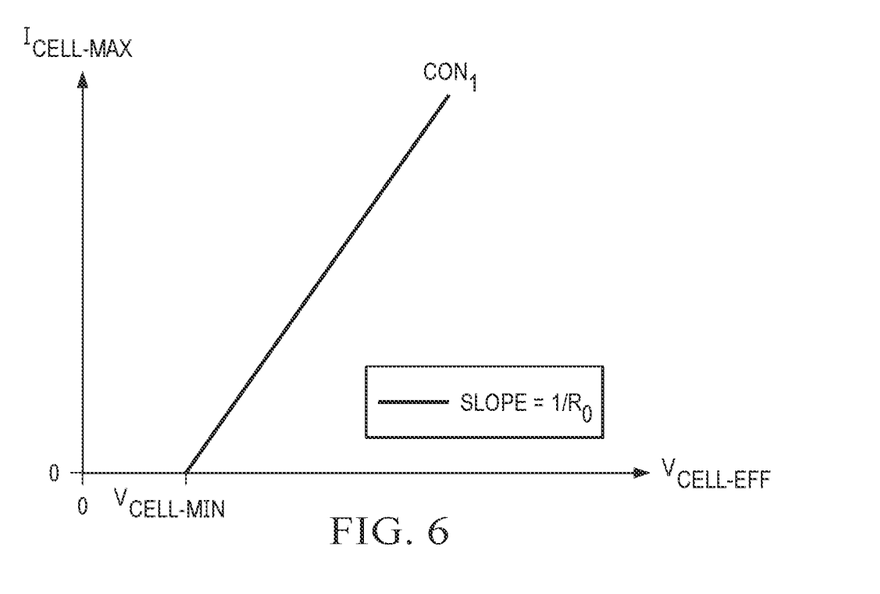
FIG. 6 illustrates an example graph of a maximum battery current versus an internal effective battery voltage for battery protection, in accordance with embodiments of the present disclosure.

Accordingly, maximum battery current $I_{CELL-MAX}$ may be a function of voltage $V_{CELL-EFF}$, assuming only battery-imposed limitations, and may be plotted as illustrated by line CON1 shown in FIG. 6.

To enforce such limitation, control circuitry 30 may implement an active protection scheme to ensure that end-of-discharge voltage $V_{CELL-MIN}$ is not violated, despite transient loads on power converter 20, so as to avoid damage to battery 12. For example, control circuitry 30 may be configured to monitor battery voltage $V_{CELL}$ at terminals of battery 12 and vary maximum battery current $I_{CELL-MAX}$ drawn by power converter 20 as shown by constraint CON1 in FIG. 6 in order to ensure battery 12 is not over-discharged to pushed beyond its safe operating range, in order to extend life of battery 12. However, complicating such control of maximum battery current $I_{CELL-MAX}$ is that the transient response of battery 12 may be a function of multiple time constants (e.g., $\tau_1, \tau_2, \ldots, \tau_N$) as described above, and it may be unfeasible or uneconomical to measure such time constants for a given battery and vary maximum battery current $I_{CELL-MAX}$ in a feedforward manner Thus, as further described below, control circuitry 30 may implement a negative feedback control loop around power converter 20 that may monitor battery voltage $V_{CELL}$ and vary maximum battery current $I_{CELL-MAX}$ to maintain battery voltage $V_{CELL}$ at a desired target value.

Figure 7:
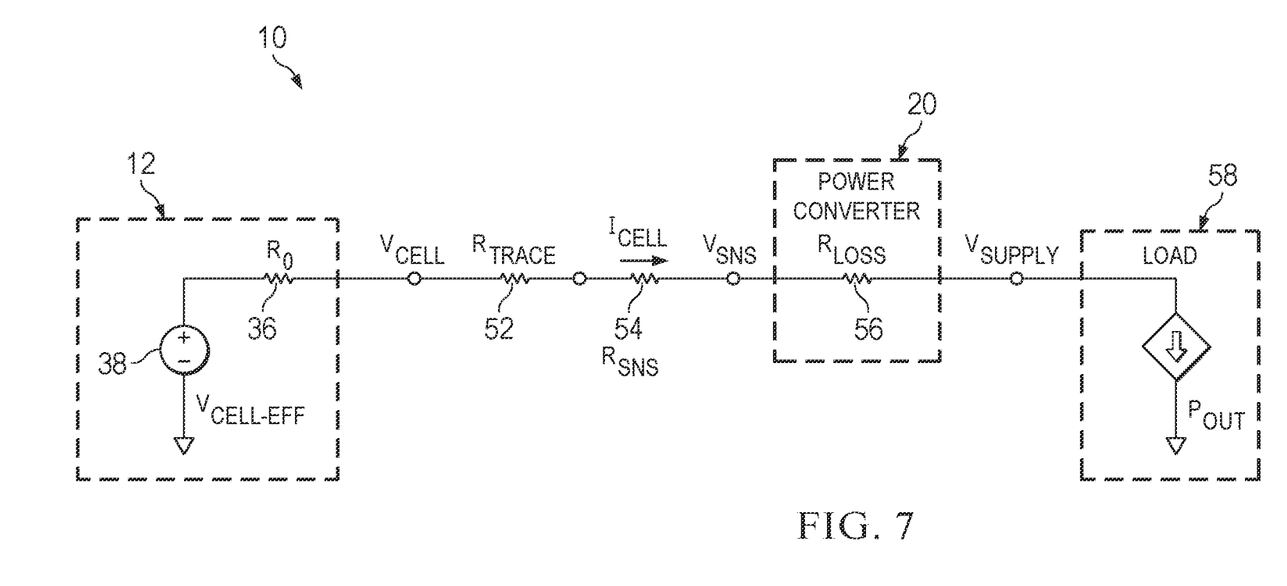
FIG. 7 illustrates a block diagram of selected impedances within the power delivery network shown in FIG. 1, in accordance with embodiments of the present disclosure.

In addition to limiting current to provide for protection of battery 12 as described above, it may also be desirable to limit current to provide stability for power converter 20, in order to operate beyond a maximum power point into a region of instability of power converter 20, as described in greater detail below. To illustrate, reference is made to FIG. 7, which depicts a detailed block diagram of selected impedances within power delivery network 10 shown in FIG. 1, in accordance with embodiments of the present disclosure. As shown in FIG. 7, power delivery network 10 may be modeled with battery 12 as shown in FIG. 5 in series with a trace resistor 52, a current sense resistor 54, an impedance 56 to model equivalent losses in power converter 20, and a load 58 representing the aggregate of downstream devices 18. Trace resistor 52 may have a resistance $R_{TRACE}$ representing a resistance of electrical conduit between battery 12 and power converter 20 (e.g., a connector, printed circuit board trace, etc.). Sense resistor 54 may have a resistance $R_{SNS}$ and may be used to sense battery current $I_{CELL}$ based on a voltage drop across sense resistor 54 (e.g., the difference between sense voltage $V_{SNS}$ and battery voltage $V_{CELL}$) and resistance $R_{SNS}$ in accordance with Ohm's law. Impedance 56 may model losses inside power converter 20 with resistance $R_{LOSS}$. After accounting for power losses occurring in these various impedances, power converter 20 may deliver output power Pour to load 58, given as:

$$P_{OUT} = I_{CELL} V_{CELL-EFF} - I_{CELL}^2 R_{TOT}$$

where $$R_{TOT} = R_0 + R_{TRACE} + R_{SNS} + R_{LOSS}$$

Figure 8:
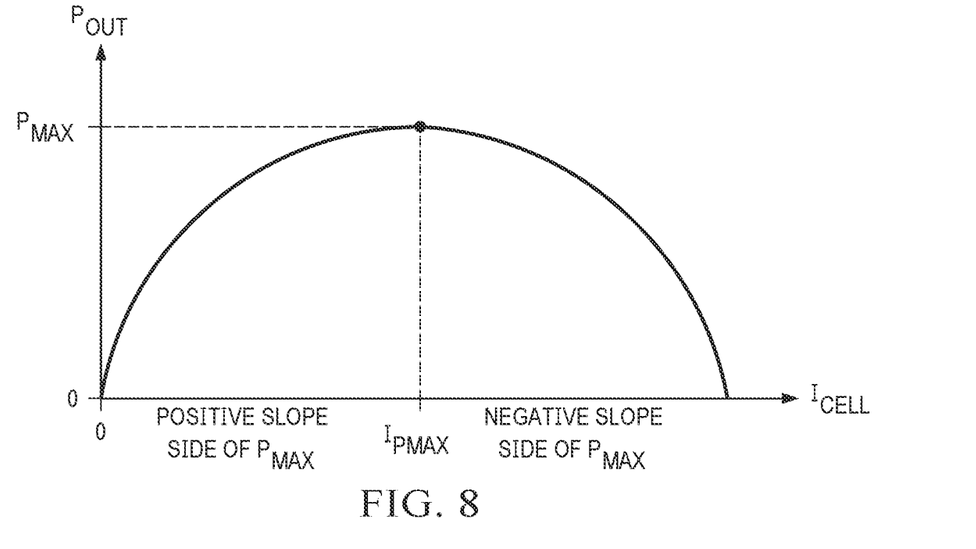
FIG. 8 illustrates an example graph of an output power of a power converter versus battery current drawn by the power converter, in accordance with embodiments of the present disclosure.

For a given total resistance $R_{TOT}$ and given voltage $V_{CELL-EFF}$, there may exist a maximum power $P_{MAX}$ for output power $P_{OUT}$ of power delivery network 10 as a function of battery current $I_{CELL}$ that occurs at a current $I_{PMAX}$, as shown in FIG. 8, where current $I_{PMAX}$ may be given by:

$$I_{PMAX} = \frac{V_{CELL-EFF}}{2 R_{TOT}}$$

Figure 9:
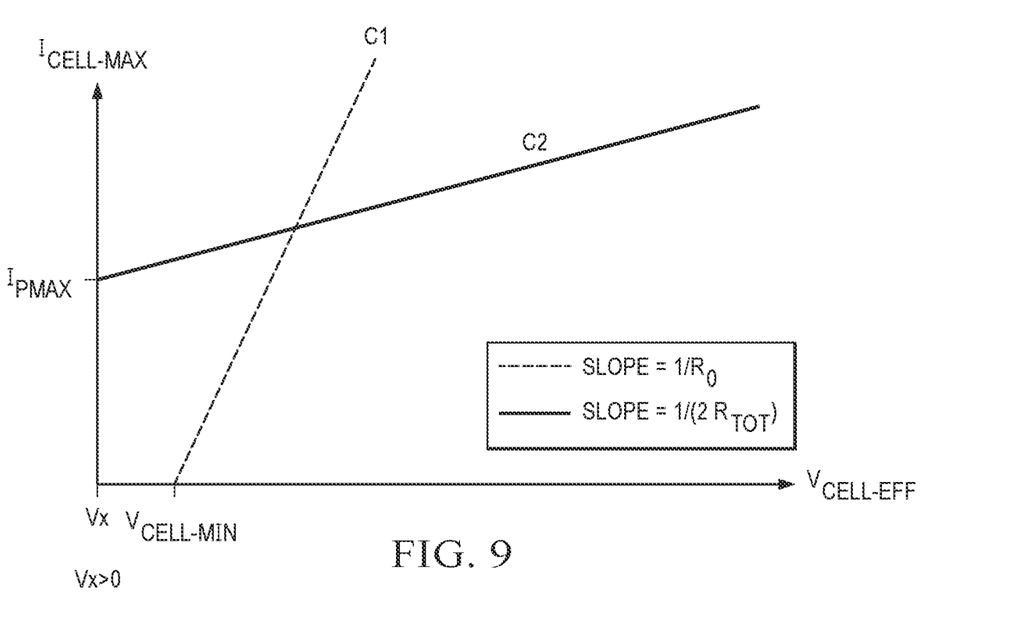
FIG. 9 illustrates an example graph of a maximum battery current versus an internal effective battery voltage for power converter stability, in accordance with embodiments of the present disclosure.

Thus, it is shown from FIG. 8 that power delivery system 10 will operate with optimum power efficiency and stability if $I_{CELL} < I_{PMAX}$, and will operate in a region of instability (negative slope of output power $P_{OUT}$ versus battery current $I_{CELL}$) when $I_{CELL} > I_{PMAX}$. This maximum allowable current $I_{PMAX}$ may be plotted as shown in FIG. 9 as constraint CON2 superimposed over constraint CON1 for maximum battery current $I_{CELL-MAX}$ depicted in FIG. 6. Because total resistance $R_{TOT}$ is greater than equivalent series resistance $R_0$, it may be evident that the slope of constraint CON1 is steeper than the slope of constraint CON2. On extrapolation, the line of constraint CON2 may intercept the horizontal axis of voltage $V_{CELL-EFF}$ at 0 V, which is not shown in FIG. 9, as many batteries (e.g., lithium-ion batteries) will not be allowed to drop to such magnitude.

For high-efficiency power converters, impedance 56 may be negligible compared to equivalent series resistance 36, trace resistor 52, and sense resistor 54, such that total resistance $R_{TOT}$ may be rewritten as:

$$R_{TOT} \approx R_0 + R_{TRACE} + R_{SNS}$$

As battery 12 is discharged with use, equivalent series resistance 36 may increase and voltage $V_{CELL-EFF}$ may decrease accordingly. Therefore, maximum allowable current $I_{PMAX}$ corresponding to maximum power $P_{MAX}$ may be a function of voltage $V_{CELL-EFF}$ and impedances of power delivery network 10.

In addition to limiting current to provide for protection of battery 12 as described above, and in addition to limiting current to provide stability for power converter 20 as described above, it may also or alternatively be desirable to limit current based on considerations of practical implementations, as described in greater detail below.

As an example, beyond a certain voltage $V_{CELL-EFF}$, the maximum battery current $I_{CELL}$, and therefore the maximum power delivery capability $P_{MAX}$, of power converter 20 may become so large that the design of power converter 20 becomes increasingly difficult or even unfeasible. Practical limitations such as, for example, inductor saturation current and required dynamic range of current sensing circuitry in power converter 20 may dictate an upper power limit $P_{LIM}$ be placed on output power $P_{OUT}$. Thermal considerations may also need to be taken into consideration and may drive a need to limit maximum power delivery from power converter 20.

Assuming output power $P_{OUT}$ is limited to power limit $P_{LIM}$, a power balance equation for power delivery system 10 may be written as:

$$I_{CELL}^2 R_{TOT} - I_{CELL} V_{CELL-EFF} + P_{LIM} = 0$$

which can be rewritten as:

$$I_{CELL-LIM} = I_{PMAX} - \sqrt{\frac{P_{MAX} - P_{LIM}}{R_{TOT}}}$$

Figure 10:
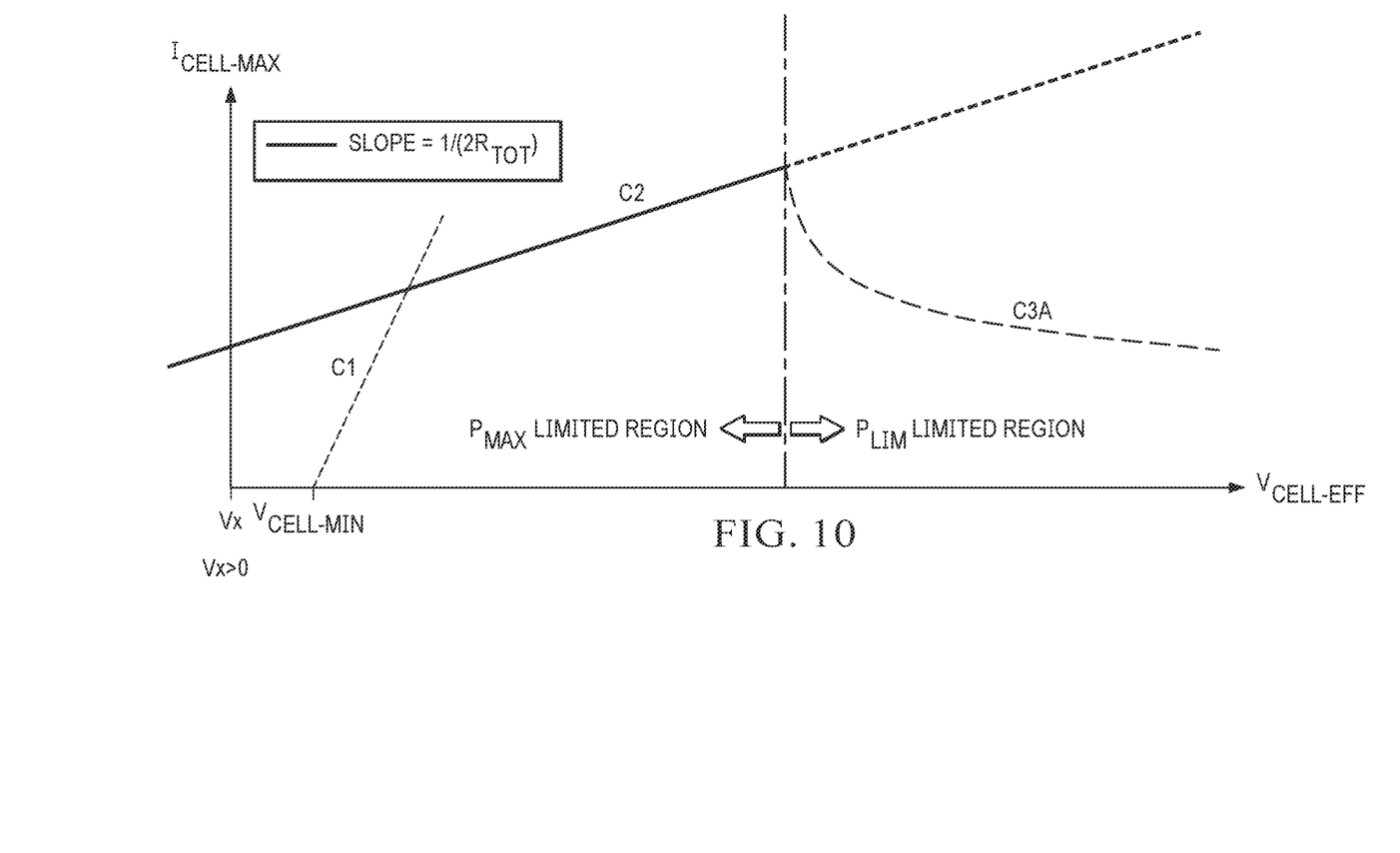
FIG. 10 illustrates an example graph of a maximum battery current versus an internal effective battery voltage for power limit considerations, in accordance with embodiments of the present disclosure.

This maximum allowable current $I_{CELL-LIM}$ may be plotted as shown in FIG. 10 as constraint CON3A superimposed over constraints CON1 and CON2 depicted in FIG. 9. A separation between two power limited regions for $P_{MAX}$ and $P_{LIM}$ are graphically shown in FIG. 10 as occurring at a breakpoint between the curves representing constraints CON2 and CON3A. In the region limited by power limit $P_{LIM}$, a maximum for battery current $I_{CELL}$ may be set by the lower of the two values for maximum allowable current. As is shown in FIG. 10, along the curve for constraint CON3A, the maximum current for battery current $I_{CELL}$ may increase as voltage $V_{CELL-EFF}$ decreases.

Figure 11:
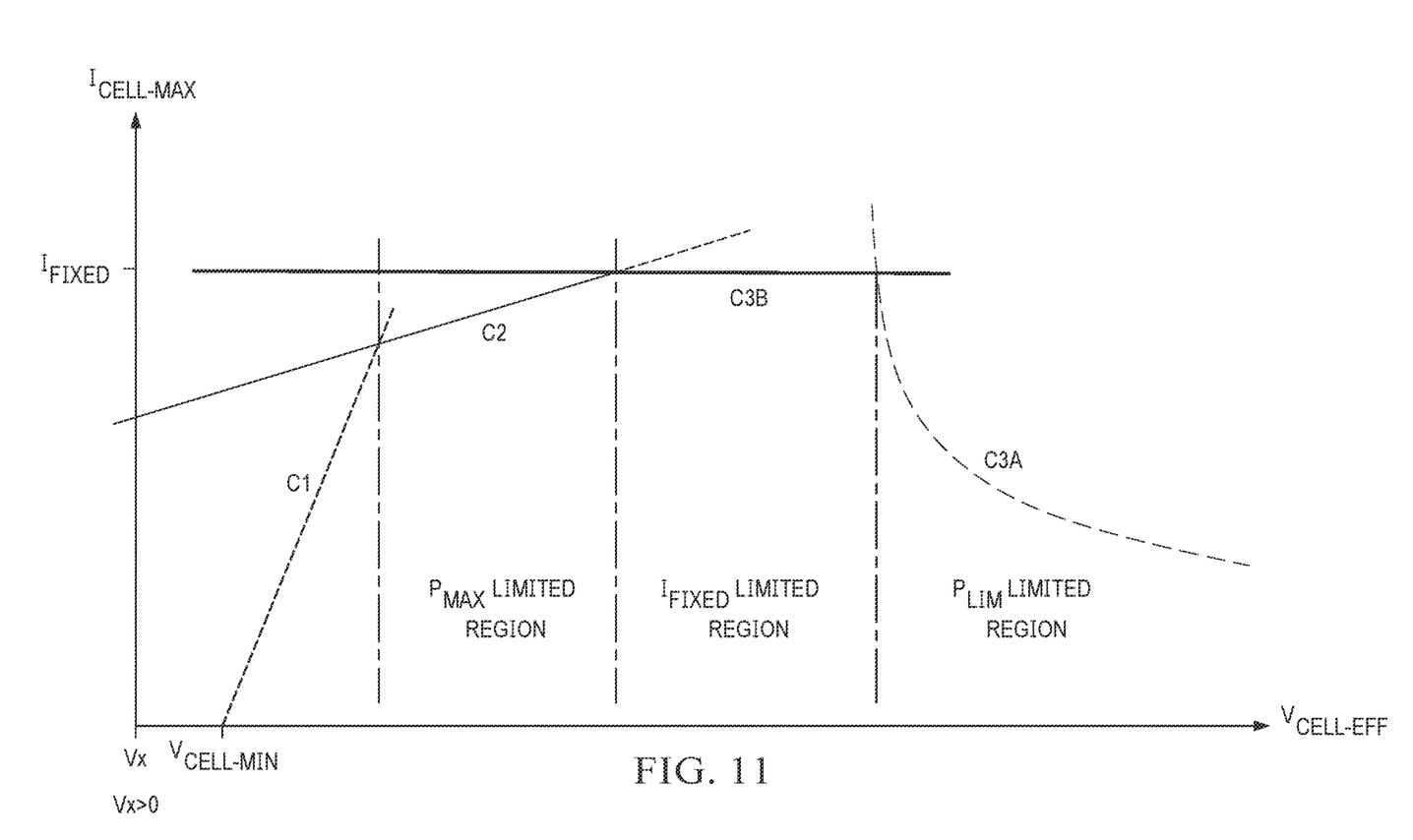
FIG. 11 illustrates an example graph of a maximum battery current versus an internal effective battery voltage for current limit considerations, in accordance with embodiments of the present disclosure.

In addition to limiting current to provide for protection of battery 12 as described above, limiting current to provide stability for power converter 20 as described above, and limiting current for power limiting considerations, it may also or alternatively be desirable to apply a fixed current limit $I_{FIXED}$ based on considerations of practical implementations, as described in greater detail below. This maximum allowable current $I_{FIXED}$ may be plotted as shown in FIG. 11 as constraint CON3B superimposed over constraints CON1, CON2, and CON3A depicted in FIG. 10. Thus the maximum current for battery current $I_{CELL}$ may be set by the lowest of the four values for maximum allowable current.

Figure 12:
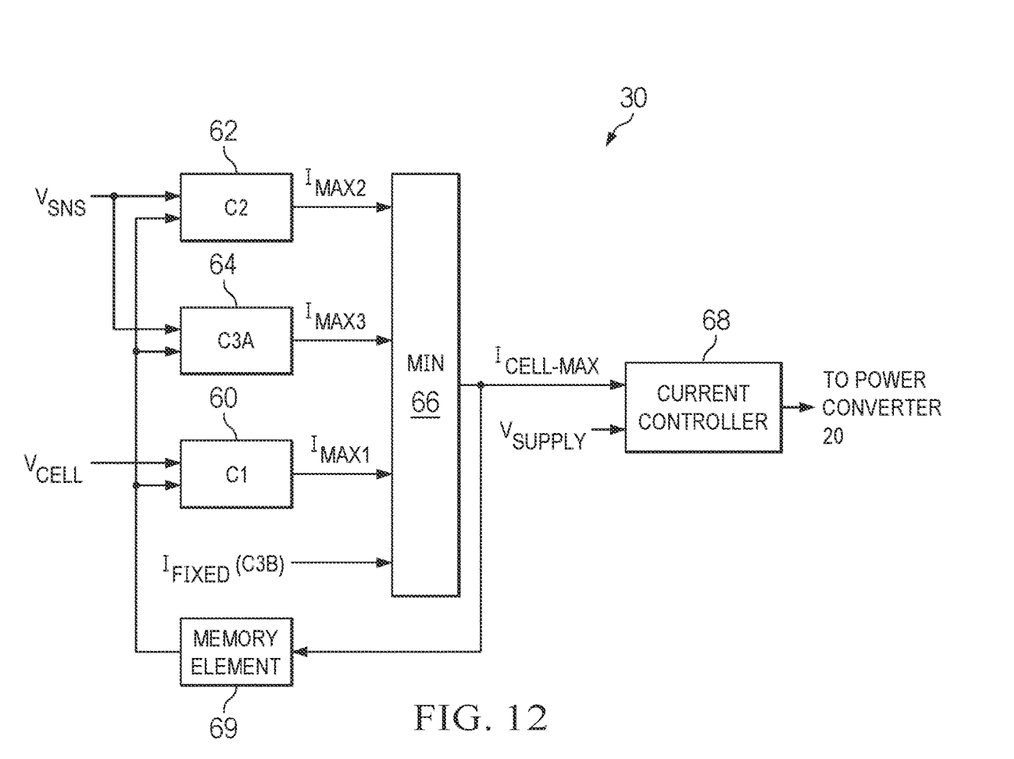
FIG. 12 illustrates a block diagram of selected components of example control circuitry for controlling a power converter, in accordance with embodiments of the present disclosure.

FIG. 12 illustrates a block diagram of selected components of example control circuitry 30 for controlling power converter 20, in accordance with embodiments of the present disclosure. In operation, control circuitry 30 may implement the current-limiting scheme described above. As shown in FIG. 12, control circuitry 30 may include reactive engines 60, 62, and 64 configured to apply constraints C1, C2, and C3A, respectively, to generate maximum constraint currents $I_{MAX1}$, $I_{MAX2}$, and $I_{MAX3}$, respectively. A minimum block 66 may select the minimum of maximum allowable current $I_{FIXED}$ (corresponding to constraint C3B) and maximum constraint currents $I_{MAX1}$, $I_{MAX2}$, and $I_{MAX3}$ to generate maximum battery current $I_{CELL-MAX}$. Control circuitry 30 may also include a current controller 68 that may, based on supply voltage $V_{SUPPLY}$ and maximum battery current $I_{CELL-MAX}$, generate switch control signals to power converter 20 to control an amount of current drawn by power converter 20.

As shown in FIG. 12, reactive engine 60 may apply constraint C1 based on battery voltage $V_{CELL}$ and the value of maximum battery current $I_{CELL-MAX}$ feedback from minimum block 66. Similarly, each of reactive engines 62 and 64 may apply constraints C2 and C3A based on sense voltage $V_{SNS}$ and the value of maximum battery current $I_{CELL-MAX}$ feedback from minimum block 66. Accordingly, each reactive engine 60, 62, and 64 may be an independent mechanism to limit power transfer of power converter 20 to satisfy two or more independent constraints (e.g., constraints C1, C2, and C3A) while each reactive engine 60, 62, and 64 is updated, from common memory element 69, with the common control parameter (e.g., maximum battery current $I_{CELL-MAX}$) that each reactive engine 60, 62, and 64 controls.

In operation, based on the previous sampled values for maximum battery current $I_{CELL-MAX}$ stored in common memory element 69 and the respective input for a reactive engine 60, 62, and 64 (e.g., battery voltage $V_{CELL}$ or sense voltage $V_{SNS}$), a reactive engine 60, 62, and 64 may increment or decrement (or, in some embodiments, leave unchanged) its respective maximum constraint current $I_{MAX1}$, $I_{MAX2}$, and $I_{MAX3}$ It is possible in some scenarios that when one of reactive engines 60, 62, and 64 increments its respective maximum constraint current, another of reactive engines 60, 62, and 64 may decrement its respective maximum constraint current. However, at any given time, no more than one of reactive engines 60, 62, and 64 may set the final state variable of maximum battery current $I_{CELL-MAX}$.

At the instant one of reactive engines 60, 62, and 64 becomes the dominant engine (e.g., its respective maximum constraint current $I_{MAX1}$, $I_{MAX2}$, and $I_{MAX3}$ is lower than maximum allowable current $I_{FIXED}$ and the other maximum constraint currents), due to the shared feedback of the global maximum battery current $I_{CELL-MAX}$, the new dominant engine may begin incrementing or decrementing its respective maximum constraint current from the exact value that its predecessor dominant engine had generated at such instant. Accordingly, because such global feedback approach may prevent a large instantaneous change in maximum battery current $I_{CELL-MAX}$, changes in maximum battery current $I_{CELL-MAX}$ may be unlikely to cause glitches in the current drawn by power converter 20, thus minimizing or eliminating current and/or voltage overshoots or undershoots within power delivery network 10. Also, providing for one shared feedback path (and associated circuitry, such as integrators or memory elements) among reactive engines 60, 62, and 64, as opposed to each having their own individual feedback paths (and associated circuitry, such as integrators or memory elements), may reduce circuit size, complexity, and cost.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. Control circuitry configured to control a power converter in accordance with a control variable, comprising:
    a first control mechanism configured to generate a first intermediate control variable based on a first physical quantity associated with the power converter;
    a second control mechanism configured to generate a second intermediate control variable based on a second physical quantity associated with the power converter;
    a selector configured to select the control variable from the first intermediate control variable and the second intermediate control variable; and
    a shared feedback memory element configured to feed back the control variable to inputs of the first control mechanism and the second control mechanism, such that:
        the first control mechanism generates the first intermediate control variable based on the first physical quantity and the control variable; and
        the second control mechanism generates the second intermediate control variable based on the second physical quantity and the control variable.

2. The control circuitry of claim 1, wherein the control variable is a maximum electrical current associated with the power delivery system.

3. The control circuitry of claim 2, wherein:
    the first intermediate control variable is a first electrical current variable;
    the second intermediate control variable is a second electrical current variable; and
    the selector is configured to select the minimum of the first intermediate control variable and the second intermediate control variable as the control variable.

4. The control circuitry of claim 1, wherein the first physical quantity is associated with a constraint of a power source to the power converter.

5. The control circuitry of claim 4, wherein the second physical quantity is associated with a constraint of the power converter.

6. The control circuitry of claim 1, wherein the second physical quantity is associated with a constraint of the power converter.

* * * * *